(12) United States Patent
Lomas

(10) Patent No.: US 11,720,210 B2
(45) Date of Patent: Aug. 8, 2023

(54) OPTICAL INPUT DEVICES

(71) Applicant: Uniphy Limited, Leeds (GB)

(72) Inventor: David Lomas, Blunsdon (GB)

(73) Assignee: Uniphy Limited, Leeds (GB)

( * ) Notice: Subject to any disclaimer, the term of this patent is extended or adjusted under 35 U.S.C. 154(b) by 0 days.

(21) Appl. No.: 17/672,903

(22) Filed: Feb. 16, 2022

(65) Prior Publication Data

US 2022/0171496 A1 Jun. 2, 2022

Related U.S. Application Data

(63) Continuation of application No. 16/514,260, filed on Jul. 17, 2019, now abandoned, which is a (Continued)

(30) Foreign Application Priority Data

Jan. 17, 2017 (GB) .................................... 1700809

(51) Int. Cl.
*G06F 3/042* (2006.01)
*G06F 3/02* (2006.01)
(Continued)

(52) U.S. Cl.
CPC .............. *G06F 3/0421* (2013.01); *G06F 3/02* (2013.01); *G06F 3/0312* (2013.01); *G06F 3/0362* (2013.01); *G06F 2203/04109* (2013.01)

(58) Field of Classification Search
CPC ........ G06F 3/0421; G06F 3/02; G06F 3/0312; G06F 3/0362; G06F 2203/04109
See application file for complete search history.

(56) References Cited

U.S. PATENT DOCUMENTS 4,484,179 A * 11/1984 Kasday ................. G06F 3/0421
250/221
5,621,196 A * 4/1997 Nishijima ............ H01H 25/041
200/6 A
(Continued)

FOREIGN PATENT DOCUMENTS

WO 2015155508 10/2015

*Primary Examiner* — Benyam Ketema
(74) *Attorney, Agent, or Firm* — Boyle Fredrickson S.C.

(57) ABSTRACT

An optical input device includes at least one optically clear plate having at least one light source positioned at a peripheral edge thereof and arranged and configured to transmit frequency modulated light into the optically clear plate along its planar length at an angle such that the modulated light is contained within the plate via total internal reflection thereof. At least one photodetector is configured to receive some or all of the modulated light. A least one input mechanism is embedded within the optically clear plate and is mechanically moveable relative thereto. A processing module receives signals from the photodetector and generates data representative of information to be displayed on a display screen. Both mechanical movement of the input mechanism relative to the optically clear plate and the application of pressure to the clear plate generate respective changes in the modulated light received by the photodetector. A change in the modulated light received by the photodetector causes the processing module to generate data representative of a change in information to be displayed on the display screen.

20 Claims, 13 Drawing Sheets

Related U.S. Application Data continuation-in-part of application No. PCT/GB2018/050119, filed on Jan. 17, 2018.

(51) Int. Cl.
*G06F 3/03* (2006.01)
*G06F 3/0362* (2013.01)

(56) References Cited

U.S. PATENT DOCUMENTS

| | | | | |
|---|---|---|---|---|
| 5,667,319 | A * | 9/1997 | Satloff | G06F 3/0219 400/472 |
| 5,936,613 | A * | 8/1999 | Jaeger | G02F 1/13306 345/184 |
| 6,157,323 | A * | 12/2000 | Tso | G06F 3/0236 400/489 |
| 7,161,136 | B1 * | 1/2007 | Wenstrand | G06F 3/0317 345/157 |
| 7,268,705 | B2 * | 9/2007 | Kong | H03K 17/969 345/168 |
| 8,125,449 | B2 * | 2/2012 | Liao | G06F 3/0428 345/158 |
| 8,223,128 | B1 * | 7/2012 | Edwards | H04L 12/40 345/32 |
| 8,816,961 | B2 * | 8/2014 | Buil | G06F 3/04162 345/161 |
| 8,994,666 | B2 * | 3/2015 | Karpfinger | G06F 3/0488 345/173 |
| 9,170,658 | B2 * | 10/2015 | Quek | G06F 3/0338 |
| 10,175,822 | B2 * | 1/2019 | Dearn | G06F 3/042 |
| 10,520,976 | B2 * | 12/2019 | Huynh | G06F 3/0412 |
| 11,567,610 | B2 * | 1/2023 | Bergström | G02B 5/0236 |
| 11,614,838 | B2 * | 3/2023 | Hayashi | G09G 3/20 345/173 |
| 2001/0007449 | A1 * | 7/2001 | Kobachi | G06F 3/0421 345/156 |
| 2002/0064018 | A1 * | 5/2002 | Suzuki | H03K 17/975 361/288 |
| 2004/0056781 | A1 * | 3/2004 | Rix | G06F 3/0202 341/20 |
| 2006/0158437 | A1 * | 7/2006 | Blythe | G06F 3/0421 345/173 |
| 2006/0227120 | A1 * | 10/2006 | Eikman | G06F 3/0425 345/175 |
| 2006/0256090 | A1 * | 11/2006 | Huppi | G06F 1/1616 345/173 |
| 2006/0284831 | A1 * | 12/2006 | Rosenberg | G06F 3/0338 345/156 |
| 2008/0007540 | A1 | 1/2008 | Ostergaard | |
| 2008/0192025 | A1 * | 8/2008 | Jaeger | G06F 3/0421 345/173 |
| 2008/0211779 | A1 * | 9/2008 | Pryor | G06F 3/0488 345/173 |
| 2011/0122091 | A1 * | 5/2011 | King | G06F 3/0421 345/175 |
| 2012/0256882 | A1 * | 10/2012 | Christiansson | G06F 3/0418 345/175 |
| 2012/0268427 | A1 * | 10/2012 | Slobodin | G06F 3/042 345/175 |
| 2017/0031527 | A1 * | 2/2017 | Dearn | G06F 3/042 |
| 2019/0107922 | A1 * | 4/2019 | Dearn | G06F 3/042 |
| 2019/0373096 | A1 * | 12/2019 | Shim | G06F 1/169 |
| 2022/0113812 | A1 * | 4/2022 | Kakinoki | G06F 3/0227 |

* cited by examiner

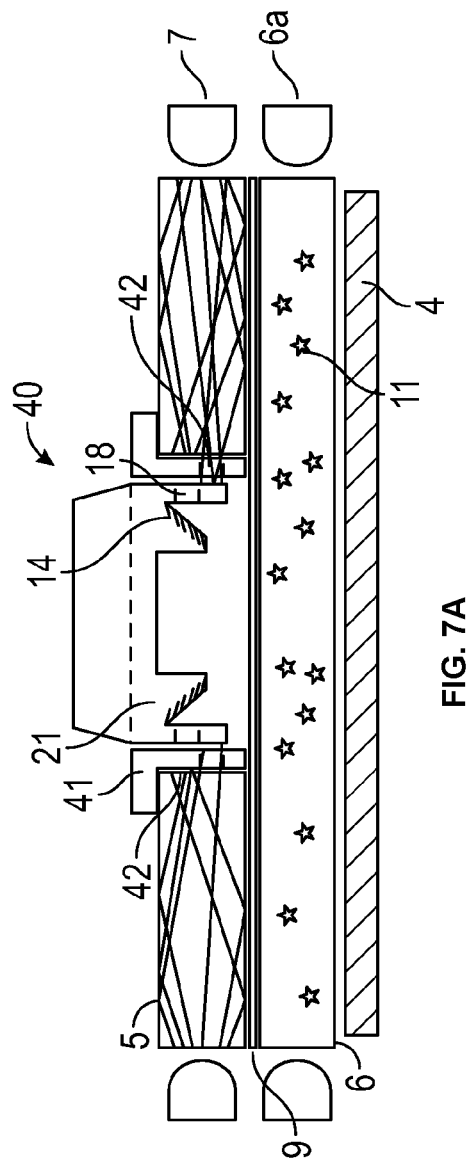
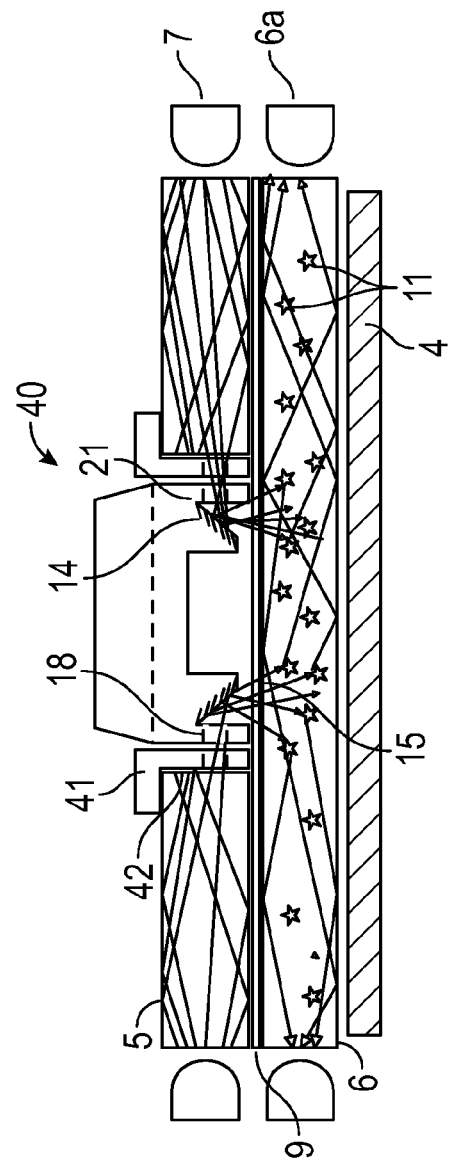

OPTICAL INPUT DEVICES

CROSS REFERENCE TO RELATED APPLICATIONS

The present application is a continuation of U.S. patent application Ser. No. 16/514,260, filed Jul. 17, 2019, which is a continuation-in-part of PCT/GB2018/050119, filed Jan. 17, 2018, which claims priority to GB 1700809.5, filed Jan. 17, 2017, the subject matter of each of which is hereby incorporated by reference in its entirety.

BACKGROUND OF THE INVENTION

1. Field of the Invention

This invention relates generally to optical-input devices for tactile user interaction with touch-sensitive display screens, more specifically, though not necessarily exclusively to optical tactile input devices such as rotary dials, switches, sliders, joysticks, pressure pads etc. or any combination thereof (hence forth referred to as tactile devices), which can be mounted into a clear plate and positioned in front of an optical display screen, such as but not restricted to an LCD or OLED display, in such a way that the tactile device can provide input to the electronic system without significantly obstructing the display.

2. Discussion of the Related Art

The use of displays in electronic devices to enhance the user interface is becoming increasingly widespread, some of which displays may be also touch sensitive. Conventional touch screen arrangements may comprise a display surface or screen, and clear, touch-sensitive surface, placed over the display surface. The technology which enables communication between user interaction (such as placement of an index finger or stylus at any point on the transparent surface) and the display screen may include resistive, capacitive or optical technologies. These touch screens provide a dynamic, software configurable user interface that can be used for a multitude of applications. However, the touch screen itself provides little to the user in terms of tactile feedback. In certain types of general use electronic devices such as mobile phones or tablets, the need for haptic or tactile feedback is less desirable than the advantages of complete flexibility and uniformity in the display/touch screen. However, in applications where the use of the touch screen/panel is much more specific in nature or even dedicated to a single set of tasks such as in the controlling of electrical/electronic appliances, machines or test equipment, it is often desirable to provide some form of tactile feedback for the user, where full configurability of the display may not be as highly sought after.

In present day systems, the user may be given a combination of touch and or traditional switches, buttons, sliders, radial dials, etc. where these tactile devices may be situated adjacent or near to the display screen but not in front of it. This is because these purely tactile devices tend to be electrical/electronic in nature and hence have wires attached to them as part of their functional operation. If they were placed in front of the display it would be necessary to conceal the wires, at least for aesthetic purposes. This is normally achieved by making a hole in the display through which the wires are fed. Alternatively, the wires could possibly be made from some transparent material such as Indium Tin Oxide (ITO), or could be removed completely and wireless communication utilised instead. However, these approaches are expensive and come with their own specific challenges and drawbacks, in terms of not only operation and fabrication but also the degree of flexibility with respect to user customisation, e.g. number, size and location of holes etc.

SUMMARY

It is an object of aspects of the present invention to address at least some of these issues and provide a cost-effective and reliable tactile device or group of tactile devices, using optical technology, which can be placed anywhere over an existing display without significantly obscuring the display in order to provide a more effective and pleasing user experience, and allow the full benefit of the display both around and/or inside the device itself. The device could be used in any electrical/electronic system where some form of tactile input is required, such as the control panel on white goods or home controllers etc. The device could also be used in conjunction with or as part of a touch panel or screen providing a hybrid touch sensitive and tactile device interface.

The tactile devices described herein are based on optical techniques and as such do not require any visible communication or power supply paths which could obstruct the useable area and appearance of the display behind the device. Also, the tactile devices could be efficiently used in conjunction with an optical touch screen technology to provide a hybrid tactile input device and touch sensitive interface capability.

In accordance with an aspect of the present invention, there is provided an optical input device comprising:
  at least one optically clear plate having at least one light source positioned at a peripheral edge thereof, arranged and configured to transmit frequency modulated light into said optically clear plate along its planar length, at an angle such that said modulated light is contained within said plate by means of total internal reflection thereof;
  at least one sensor configured to receive some or all of said modulated light;
  at least one input mechanism embedded within said optically clear plate configured to be mechanically moveable relative thereto;
  a display screen communicably coupled to said at least one photo detector; and
  a processing module for receiving signals from said at least one photo detector and generating data representative of information to be displayed on said display screen;
  wherein, the device is configured such that both mechanical movement of said input mechanism relative to said optically clear plate and the application of pressure to said clear plate generates respective changes in said modulated light received by said at least one photodetector; and wherein a change in the modulated light received by said at least one photodetector causes said processing module to generate data representative of a change in information to be displayed on said display screen.

Optionally, in accordance with one exemplary embodiment of the present invention, the at least one sensor may be a photodetector.

In accordance with a first exemplary embodiment of the present invention the device may further comprise an optically dispersive base plate wherein the at least one photo detector is positioned at a peripheral edge thereof, the display screen being situated beneath the optically dispersive base plate.

Optionally, the device may comprise exactly two optically clear plates. Each plate may have at least one light source positioned at a peripheral edge thereof, at least one light source may be arranged and configured to transmit frequency modulated light into each said optically clear plate along its respective planar length, at an angle such that said modulated light is contained within said plate by means of total internal reflection thereof, wherein the frequency modulated light contained within one said plate may be modulated at a different frequency to the frequency modulated light within the other said plate.

According to one exemplary embodiment, the input device may be a substantially cylindrical, optically clear, rotary, dial. Optionally, the rotary dial may further comprise an angled reflector within the dial positioned off centre and angled downwardly toward the base plate, where the angled reflector may transmit incident light from the at least one light source down onto the optically dispersive base plate, wherein the intensity of the light may be dispersed as it travels toward the at least one photodetector.

Optionally, according to one exemplary embodiment of the present invention, the rotary dial may further comprise at least two concentric grating rings, an inner grating ring and an outer grating ring, positioned within the optically clear dial, which share the same central axis as said rotary dial and are rotatable in opposing directions about said central axis, relative to one another. Optionally, the outer grating ring may comprise a plurality of optically clear apertures. Furthermore, the inner grating ring may comprise a single optically clear aperture.

In accordance with one exemplary embodiment, the single optically clear aperture on said inner grating ring is fixed in alignment with said reflector.

In a second exemplary embodiment of the present invention, the input mechanism may be a generally cylindrical push switch which may have an opaque circumferential side, and a circular top side, configured such that the switch may be moveable between an open configuration and a closed configuration.

Optionally, the switch may further comprise a generally circular angled reflector which runs around the inner perimeter of the push switch, the reflector being angled downwardly toward the base plate. The switch may further comprise at least one optically clear aperture in the circumferential side.

Optionally, in accordance with a second embodiment of the present invention, when the switch is in the open configuration, the optically clear aperture may be misaligned with said reflector such that no light is transmitted into said base plate. When the switch is in the closed configuration, the optically clear aperture may be aligned with said reflector, such that light is transmitted into said base plate.

According to a second exemplary embodiment, application of pressure to the circular top side of said switch moves it from said open configuration to said closed configuration.

In a third exemplary embodiment of the present invention, the input mechanism may be comprised of a generally cylindrical optically clear rotary dial, said rotary dial comprising at least one curved reflector fixed to the circumferential side of said rotary dial. The optically clear plate may be surrounded by a plurality of optical transmitter and receiver pairs.

In a fourth exemplary embodiment of the present invention, the input mechanism may be an optically clear generally cylindrical rotary dial, and may have an off-centre optically dispersive rod run through it. The optically clear plate may be surrounded by alternating optical transmitter and receiver pairs, where each optical transmitter may be geometrically opposite one of each optical receiver.

In accordance with any of the exemplary embodiments of the present invention, the input mechanism may further comprise a local power source, a local photo detector, and a local light source. The power source may comprise a battery cell and a solar cell.

BRIEF DESCRIPTION OF THE DRAWINGS

These and other aspects of the present invention will become apparent from the following description in which embodiments of the present invention are described by way of examples only and with reference to the accompanying drawings, in which:

FIGS. 7A and 7B are schematic cross-sectional views diagrams of a passive optical push button switch according to yet another exemplary embodiment of the present invention based on a dual plate arrangement;

DETAILED DESCRIPTION

Figure 1:
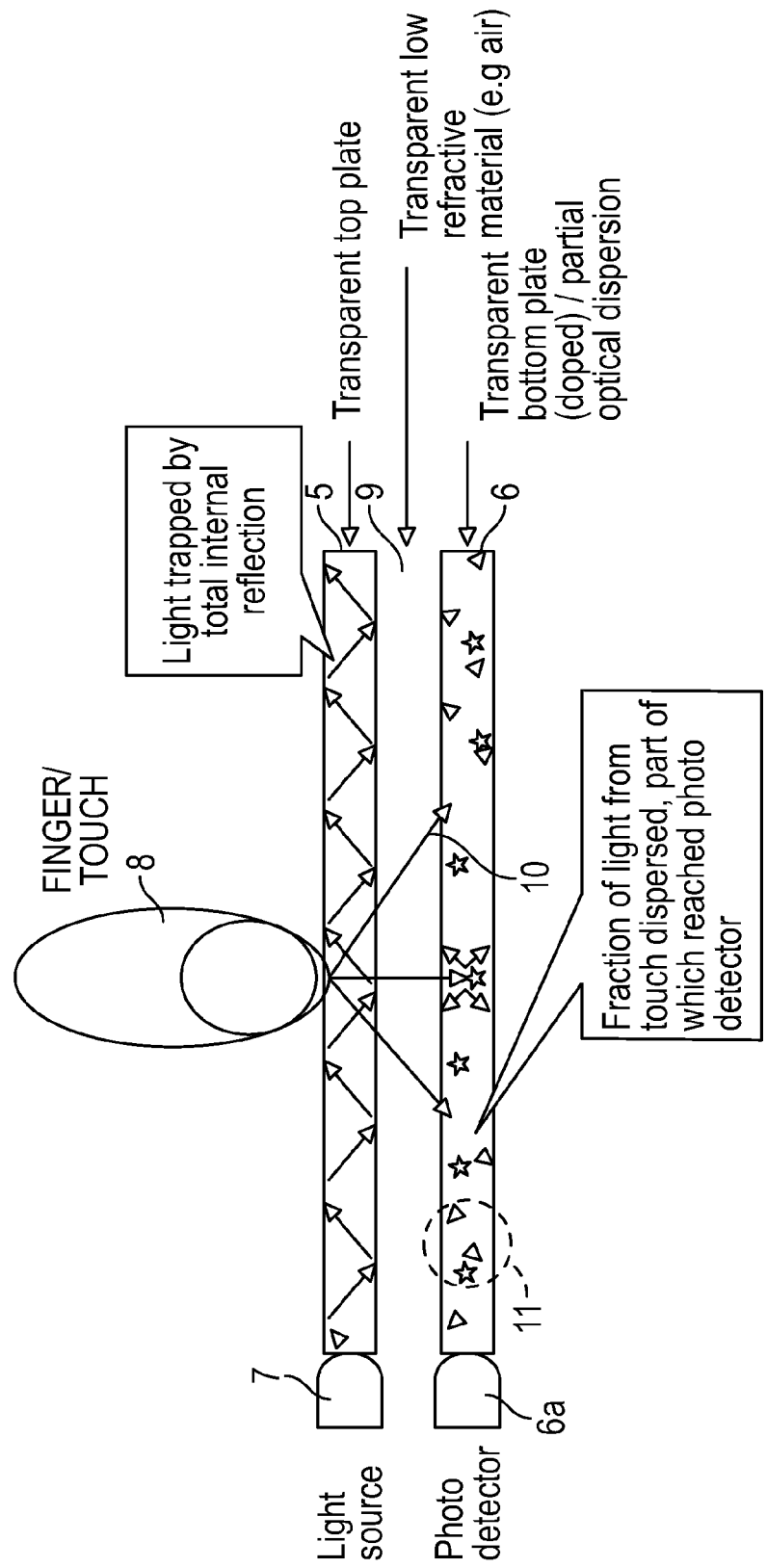
FIG. 1 is a schematic diagram showing a prior art touch-sensitive screen suitable for use with an exemplary embodiment of the present invention.

The underlying technology will now be explained with reference to FIG. 1 of the drawings, in which there is shown an exemplary embodiment of a known screen which may be suitable for use with the present invention. Optically clear plates 5, 6 are separated by a lower refractive index gap 9. The top plate 5 is substantially rectangular in shape and surrounded by a plurality of light sources 7. These sources may be specifically LED light sources 7, but may be any suitable light source as is known in the art (OLED, laser, etc). The light sources 7 inject frequency modulated light evenly at a predetermined angle. This angle is such that the light is contained within the top plate by Total Internal Reflection (TIR). The specific angle required for TIR to occur is determined by the material used to create the top plate 5, and is known as the 'critical angle'. This can be easily calculated using Snell's Law if the refractive indexes of the top plate 5 and the lower refractive index gap 9 is known. Contact on the top plate 5 by a users digit or touch screen stylus 8 frustrates the total internal reflection within the top plate 5, allowing some escaped light 10 to be emitted into the lower refractive index gap 9 at the location of contact.

The bottom plate 6 is lightly doped with light scattering particles 11. Escaped light 10 from the top plate travel through the lower refractive index gap 9 and into the bottom plate 6. The escaped light 10 is then captured within bottom plate 6 by TIR. As the light 10 travels along the length of the bottom plate 6, it is incident on light scattering particles 11. These light scattering particles 11 scatter incident escaped light 10 changing the angle of incidence on the inner surfaces of the bottom plate 6, thus allowing the scattered light to exit the bottom plate 6. The light 10 dissipates as a function of distance travelled along the bottom plate 6. The light which reaches the edge of the bottom plate 6 is picked up by sensors, such as photo detectors 6a. Photo detectors 6a are positioned all around the perimeter of the bottom plate 6 and face inwardly to the centre of the bottom plate. As the position of the photo detectors 6a is known and the relative light intensity detected, a computer can thus calculate the exact position of the contact point.

Purely, by way of examples, various embodiments of this technology, and the manner in which they operate, are described in WO2015/155508. However, it will be appreciated that other optical touch screen technologies may be suitable for use with aspects of the present invention, and the invention is, therefore, not necessarily intended to be limited in this regard.

Figure 2:
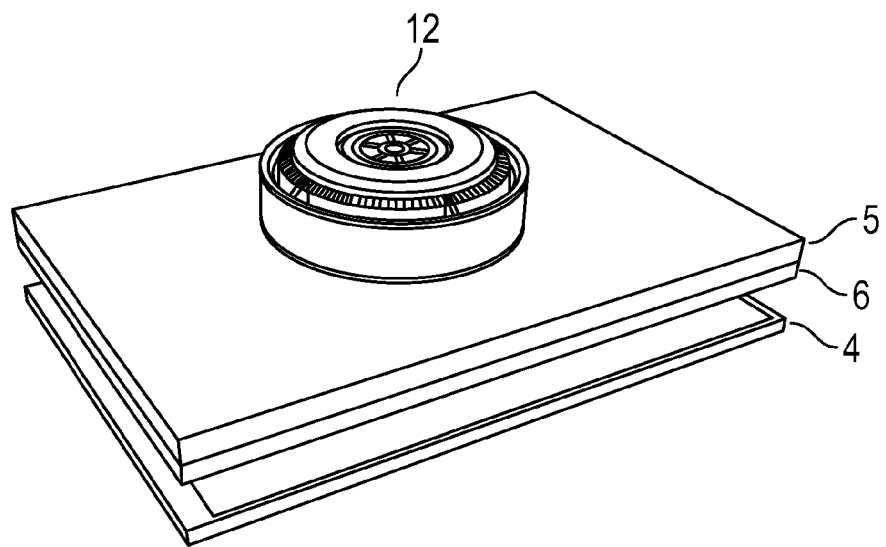
FIG. 2 is a schematic perspective view of a tactile input device according to an exemplary embodiment of the present invention in the form of a passive rotary dial embedded in a touch-sensitive display screen.
Figure 3:
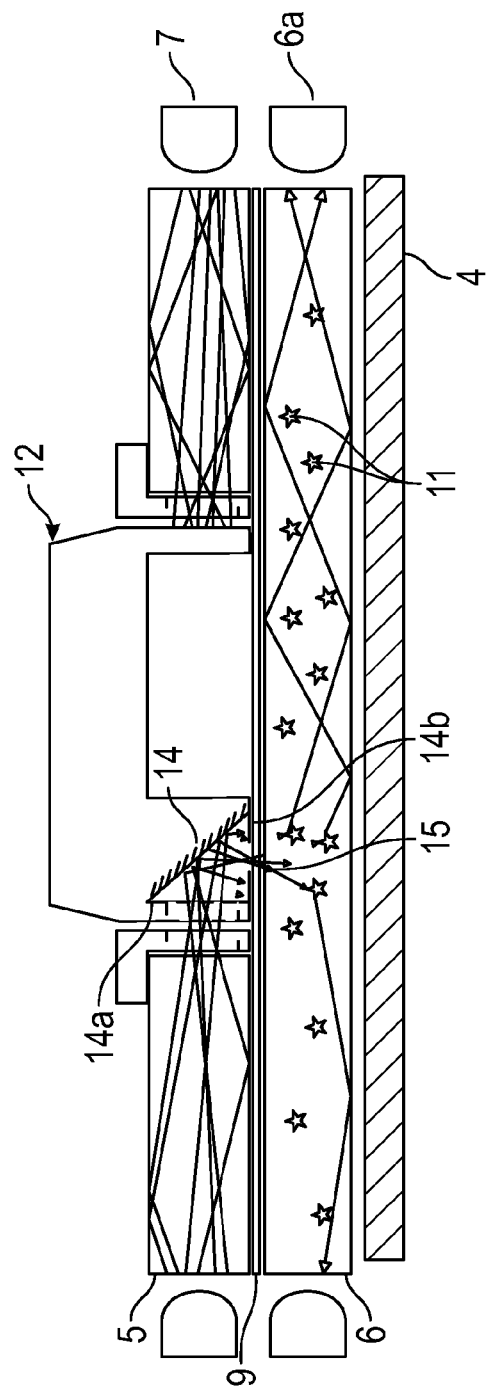
FIG. 3 is a schematic cross-sectional view of the passive optical rotary dial of FIG. 2.
Figure 4:
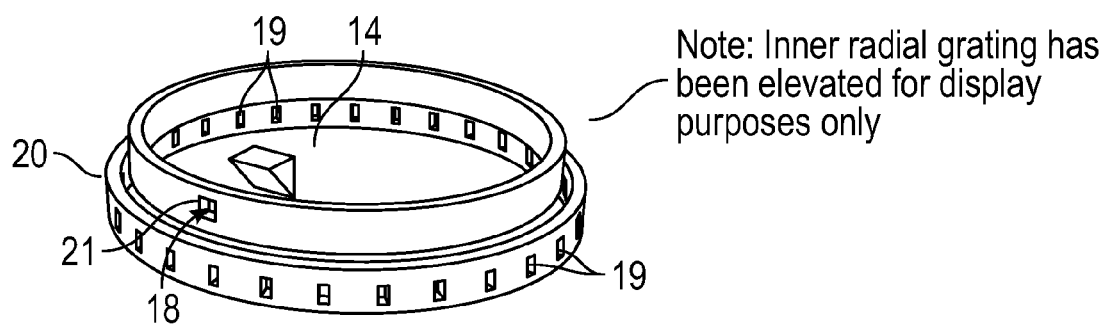
FIG. 4 is a schematic exploded view diagram showing the inner parts of the passive rotary dial of FIG. 2.

Referring to FIGS. 2, 3 and 4 of the drawings, there is illustrated a first exemplary embodiment of the present invention wherein a rotary dial 12 is embedded in the surface of a top plate 5 of the optical touch sensitive screen. In this exemplary embodiment the touch sensitive screen comprises two layers of optically clear plates 5, 6 with a layer of a material having lower refractive index placed therebetween, as described with reference to FIG. 1 of the drawings. A display screen 4 can be placed beneath the touch sensitive screen which may comprise any known display screen such as, but not limited to LED or OLED display screens. Light is injected evenly into the top plate 5 by a plurality of LEDs 7 positioned evenly around the perimeter of the device. This light is contained within the top plate 5 by TIR as before.

The dial 12 is substantially cylindrical in shape, and is embedded all the way through the top plate 5 until it reaches the lower refractive index gap 9. An angled reflector 14 is positioned within the rotary dial 12, having a generally right-angled triangular cross-section. The vertical wall 14a of the reflector is approximately adjacent the top plate 5 and faces outwardly toward the edges of the top plate 5. The horizontal wall 14b of the reflector 14 is adjacent the lower refractive index gap 9 and faces downwardly toward the bottom plate 6. The angled wall is at such an angle that it reflects incident light down into the lower refractive index gap 9 and therefore into the bottom plate 6.

As described above in relation to the touchscreen of FIG. 1, wherein the touch position is determined by the light intensity detected by the photo detectors 6a positioned around the bottom plate 6, the relative position of the rotary dial can be determined by similar methods. Referring specifically to FIG. 4 of the drawings, the rotary dial further comprises a light pulse generating mechanism constructed from a pair of concentric opaque circular grating rings, the inner ring 21 and the outer ring 20. The outer ring 20 has optically transparent apertures 19 spaced at equal intervals around the ring. The inner ring has only a single optically transparent aperture 18 positioned at a point in the ring which aligns with the reflector 14.

Referring particularly to FIG. 4 of the drawings, the two rings 20, 21 may rotate in opposing directions relative to each other. The inner ring 21 is fixed to the rotary dial 12 and is arranged such that the aperture 18 is always aligned with the reflector 14. Light incident on the outer ring 20 from light sources 7 is only incident on the reflector 14 when apertures 18 and 19 align. Therefore, in use, whilst the rotary dial is being turned, the light is incident on the reflector 14 in a series of pulses 15. Light pulse 15 can be seen best in FIG. 3 of the drawings.

It is desirable to have the mechanism come to rest at a position wherein the apertures 18, 19 are always aligned, or always completely not aligned, to ensure no light pulses are generated when not required. This can be done by a mechanical arrangement such as those known in the art, for example, saw-tooth click mechanisms or a plurality of circumferentially arranged magnets, and the present invention is not intended to be limited in this regard.

In FIG. 4 of the drawings, the outer and inner grating rings 20, 21 are shown to be on different planar elevations. This is to clearly show the component parts only, it is to be understood that, in use, the two rings 20, 21 would be fitted at the same planar elevation, at least in the illustrated exemplary embodiment.

In the above example, only a single aperture 18 through the inner ring 21 and single reflector 14 is shown, though it will be apparent to those skilled in the art that multiple apertures 18 and reflectors 14 may be used. The pulses of light 15 are directed downwardly through the lower refractive index gap 9 toward the lightly doped bottom plate 6, which scatters the light as before and the rotational position of the rotary dial can thereby be determined.

Thus an entirely optical tactile input device is provided which, in contrast to prior art devices, requires no wiring. This means the wires which would otherwise obstruct the display are no longer there and the present invention therefore facilitates the provisions of a cleaner, more integrated, display. It will be apparent to those skilled in the art that in place of a reflector 14, an optical element such as a refractor, diffuser, diffractor or any combination thereof may also be used.

As the rotary dial 12 is purely optical the display may be seen through the dial itself, allowing for different displays to be shown on the dial. For example, if the dial were to be used on a washing machine display, the dial itself could display the wash-cycle selected by the relative position of the dial.

Figure 5:
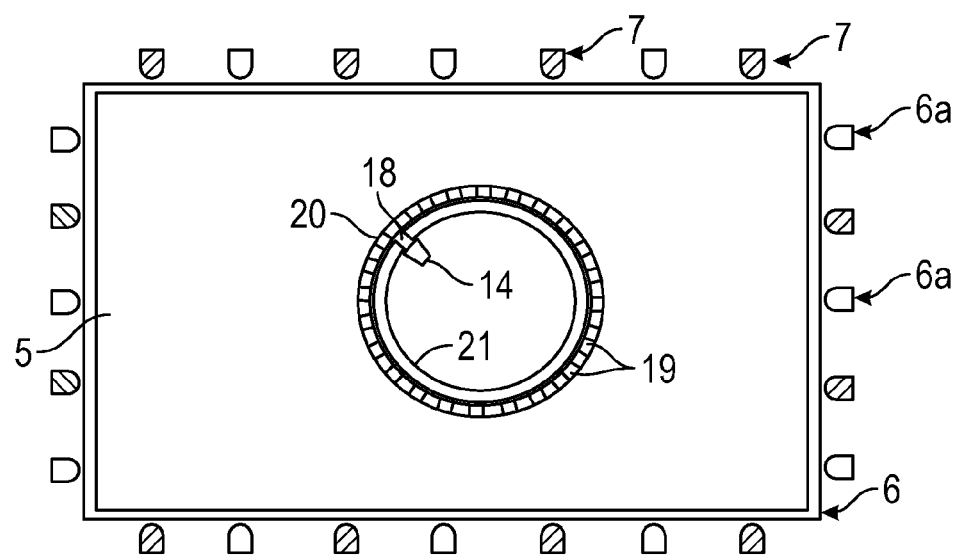
FIG. 5 is a schematic plan view diagram of a tactile input device according to a second exemplary embodiment of the present invention in the form of a passive rotary dial alternative exemplary embodiment of the rotary dial of FIG. 2.

In an alternative embodiment, and referring to FIG. 5 of the drawings, the light pulse generating mechanism may include a fixed grating ring 20. In this embodiment, the fixed grating ring 20 has a plurality of apertures 19 and remains fixed in the same position such that each aperture 19 is in the same place relative to the light sources 7. There is also an inner grating ring 21 comprising a single aperture 18 through which light may pass. The reflector 14 and inner grating ring 21 rotates with the rotary dial 12. When apertures 19 on the fixed grating ring 20 align with apertures on the inner grating ring 21, light passes through to the reflector and a pulse of light 15 (see FIG. 4 of the drawings) is injected into the bottom plate 6 as the apertures pass the alignment position. The exact location of the pulse of light 15 incident on the reflector 14 (and therefore the bottom plate 6) is dependent upon the position of the aperture 19 through which light passes. The pulse of light 15 is then detected and its position determined as described above.

In this embodiment, the optical radial dial can be used in conjunction with the surrounding touch screen detection system, thus providing a hybrid touch screen and tactile input device interface, without a significant modification to the existing touch screen detection system.

A potential issue that may arise when using the optical dual plate touch sensitive display technology described above, is that the system may not have as good multi-touch capabilities as, for example, projected capacitive touch sensitive display technologies. A system comprising an optical touch screen and a rotary optical dial such as those described above may, in some cases, confuse the computer algorithms as interference of signals can occur. If a touch on the screen and a pulse of light from the dial above occur simultaneously, they can interfere with each other when the algorithms are trying to determine their relative positions.

One way in which this potential issue may be addressed is by associating a touch to the top plate 5 and operation of the dial 12 with light of different optical frequencies (and so also of different wavelengths). An embodiment of the system in which this concept is implemented includes a plurality of primary light sources that illuminate the top plate 5 and a plurality of secondary light sources that illuminate the top plate 5, these sources surrounding the top plate 5 in a similar manner to that described in relation to previous embodiments. The primary light sources emit light at a primary optical frequency, and the secondary light sources emit light at a secondary optical frequency, the primary frequency being different to the secondary frequency.

The system may then further include one or more optical frequency selective elements or filters. The filter or filters have a frequency response such that they block light at the primary frequency but transmit light at the secondary frequency. The filter or filters are positioned in the system so as to block light at the primary frequency from being admitted into the dial 12. In an embodiment having a similar layout to that of FIG. 4, for example, this may be achieved by providing a single filter in front of the aperture 18 of the inner ring 21 of the dial 12, and/or by providing a filter in front of each of the apertures 19 of the outer ring 20 of the dial 12.

In this way, light at the primary frequency that reaches the sensors 6 can only be attributed to a touch on the top plate 5, and not to operation of the dial 12, because this light impingement is prevented by the filters from entering the dial 12. Thus, a distinction can be made between a touch on the top plate 5 and a pulse from the dial 12. It should be noted that, whilst the above embodiment includes a plurality of primary and secondary sources each emitting at a single frequency, other embodiments may instead include a plurality of broadband or multiband light sources that each provide light at both of the primary and secondary frequencies.

Another way in which this issue may be mitigated by a further exemplary embodiment of the present invention described with reference to FIG. 6.

Figure 6:
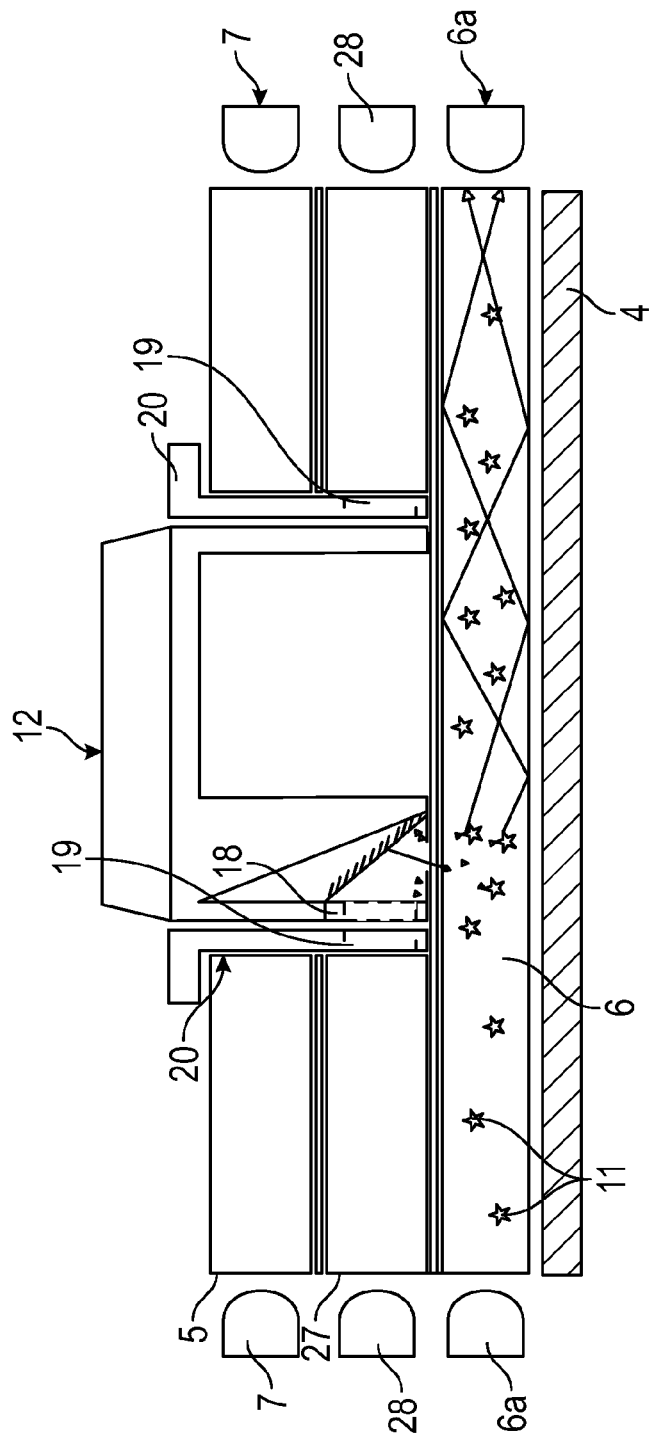
FIG. 6 is a schematic cross-sectional view diagram of a passive optical rotary dial according to an exemplary embodiment of the present invention based on a triple plate touch-sensitive display screen arrangement according to a second exemplary embodiment of the present invention.

Referring to FIG. 6 of the drawings, there is provided an optical touch sensitive display comprising an optical rotary dial 12, embedded in a triple-plate display screen. The triple-plate display screen comprises a top plate 5 and a bottom plate 6 as in the previous embodiments, however it also comprises an additional middle plate 27. The top plate 5 detects touches from a user's index finger or stylus, for example, in the way as described above with reference to FIG. 1 of the drawings. The middle plate detects rotational movement of the optical rotary dial 12 as described with reference to any of the FIGS. 2-5 of the drawings. Each plate 5, 6, 27 is spaced apart by a lower refractive index gap 9. Plates 5, 27 are surrounded by a plurality of light sources 7, 28. The light sources 7 of the top plate 5 are modulated on a first frequency $f_1$. The light sources 28 of the middle plate 27 are modulated on a second frequency $f_2$. Frequencies $f_1$ and $f_2$ are always different to each other, and labelled by the algorithms such that the computer can distinguish between information regarding a touch position, and information regarding a dial rotational position.

The reflector 14 is positioned such that the vertical wall 14a of the reflector does not extend higher than the upper surface of the middle plate 27. Additionally, apertures 18, 19 may not be provided in the inner and/or outer rings 20, 21 in any other plane than the one which corresponds with the middle plate 27. This ensures that the light in the top plate 5 cannot be confused by rotational movement of the dial.

Referring now to FIGS. 7A and 7B of the drawings, there is provided a fourth exemplary embodiment of the present invention. Here, the tactile display input device is not a rotary dial, but a switch 40 which can be turned on/off by application of pressure to the upper face of the switch.

As with previous embodiments, there is provided a top plate 5 surrounded by a plurality of light sources 7 (which may be LED or OLED) which emit frequency modulated light and inject it into the plate 5 where it is captured by TIR. A switch 40 is provided, embedded into the top plate 5 in the switch housing 41. The switch housing 41 has a plurality of apertures 42. Unlike the rotary dial described above, the switch does not rotate therefore the apertures 42 do not rotate relative to the light sources 7. An inner grating ring 21 also comprises a plurality of apertures 18 which are always in longitudinal alignment with the apertures 42 in the switch housing 41. For this embodiment, the number of apertures 18 in the inner grating ring 21 can be equal to the number of apertures 42 in the switch housing 41 as the computer is now not looking for rotational positional data, but data relating to one of two states; open or closed. A reflector 14 runs continuously around the inside of the switch 40. A bottom plate 6, lightly doped with light scattering particles 11 is separated from the top plate 5 by a lower refractive index gap 9.

When the switch is open, apertures 18 are misaligned with apertures 42 such that light incident on apertures 42 cannot travel through to be incident on the bottom plate 6, and therefore no signal from the switch is detected by the computer and therefore the switch 40 is determined to be in the open position.

Referring specifically now to FIG. 7b of the drawings, application of pressure to the switch 40 pushes the switch into the closed position. Here, apertures 18 and 42 are aligned, allowing the light to pass through to the reflector 42 and be reflected down into the bottom plate 6. The presence of the reflected light can now be detected and from the change in detected light levels the exact location and hence identity of the switch can also be determined, therefore the switch 40 is now determined to be in the closed position. The computer can be programmed to respond to opening and closing of the switch by turning a certain function on or off, for example if this display were to be located on a tumble dryer, such a switch 40 may be used to turn the power on or off.

Any suitable mechanical mechanism may be used to move the switch from the open to the closed position, and vice versa, and the invention is not intended to be limited in this regard. For example, a spring or magnetic mechanism may be used. Similarly, in the exemplary embodiment described above, the apertures 18, 42 are aligned by longitudinal movement of the switch, however it would be clear to those skilled in the art than this could easily be made to work using a simple rotary motion generated either by a vertical press and a simple rotary mechanism or by a rotary switching operation by the user. This is not necessarily intended to form part of the invention.

Optionally, the mechanical mechanism for implementation of alignment of the apertures 18, 42 could be used to produce either a continuous beam of modulated light for the duration of closure of the switch 40, or a simple pulse of modulated light by making the alignment a transient part of the actuation. From this, it can be seen how a slider, up-down pad, joystick, or some other optical tactile input devices could be easily constructed with the present invention.

The exemplary embodiments described above are so-called 'passive' embodiments of the present invention, since they require no power sources themselves to work, and only use the light energy in the top plate 5 into which the device is embedded to function. The following exemplary embodiments of the present invention have their own power source, and are therefore referred to herein as 'active' optical tactile devices.

Figure 8:
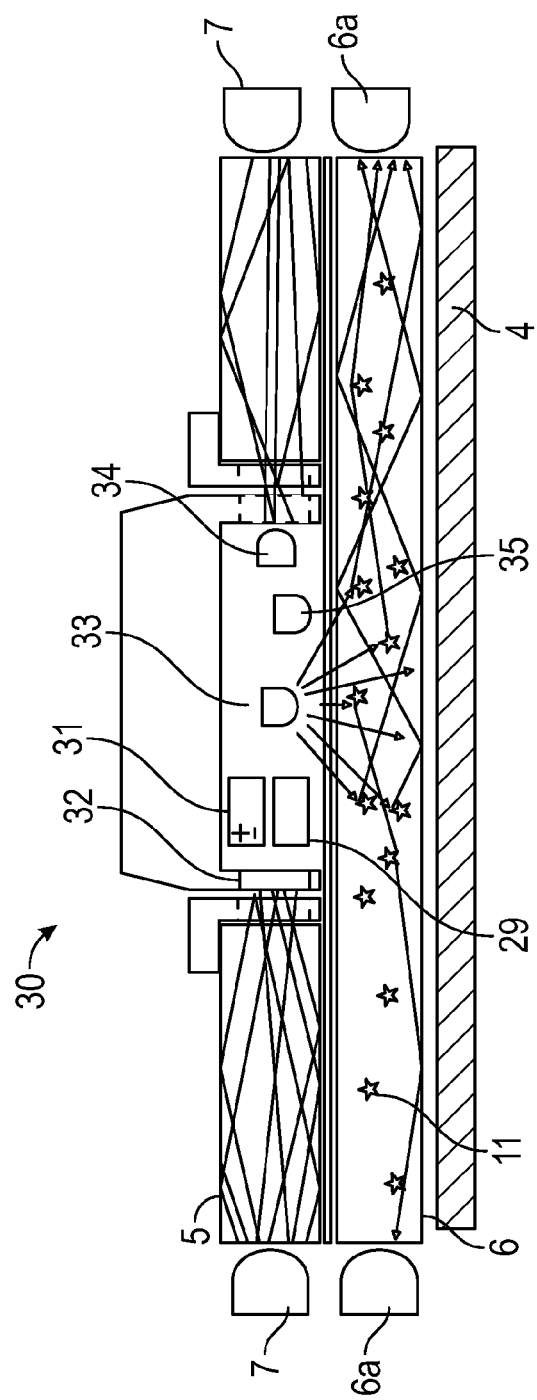
FIG. 8 is a schematic cross-sectional view of an active optical rotary dial according to another exemplary embodiment of the present invention based on a dual plate arrangement.

Referring to FIG. 8 of the drawings, an optical tactile input device 30, such as any one of those described above with reference to FIGS. 2-7, is embedded into an optical touch-sensitive screen, as before. The touch-sensitive screen thus comprises a top plate 5 surrounded by a plurality of light sources 7, a bottom plate 6 surrounded by a plurality of photodetectors 6a, and a display screen 4. The optical tactile input device 30 includes a power source, in this embodiment a battery 31, and a solar cell 32 (or similar optical energy transducer). The solar cell 32 may use ambient light or light from the light sources 7 in the top plate 5. Ambient light, or light in the top plate 5 may be used to "trickle charge" the battery 31, i.e. charge it at the same rate as it discharges. If more energy is required than available to the solar cell 32, then an additional dedicated and directed beam of light in the top plate 5 could be used to boost the available energy to the system. The tactile device 30 can then use this power to drive its own modulated frequency light source 33 via some local electronic processing circuitry 29. This light source 33 may be modulated at the same frequency as the light sources 7 around the perimeter of the top plate 5. Alternatively, the light source 33 may be modulated at a different frequency to the light sources 7 such that the system can differentiate between touch actions and tactile device actions. This removes the need for a middle plate 27 (as described with reference to FIG. 6 of the drawings).

Alternatively, the means by which the tactile devices position or state is conveyed can be achieved via measuring these directly from the tactile device itself, and then encoding this data onto the modulated light signal. This information is then detected directly by the photodetectors 6a around the bottom plate 6 and decoded by the computer. This achieves the same results as having a middle plate 27 (as shown in FIG. 6 of the drawings) or as having a light source 33 modulated at a different frequency to the light sources 7, wherein the computer is able to differentiate between the optical tactile input device action, and a touch action. Thus, allowing the optical tactile input device 30 and touch screen to be used simultaneously.

Inclusion of a local power source, such as a battery 31, adds a further degree of flexibility and an enhances level of capability to the tactile device to incorporate additional electric functions, for example; proximity detectors, pressure sensors, ambient temperature sensors, finger print readers, camera, near field communicators, radio links to its own or other systems and additional switches, etc.

Figure 9:
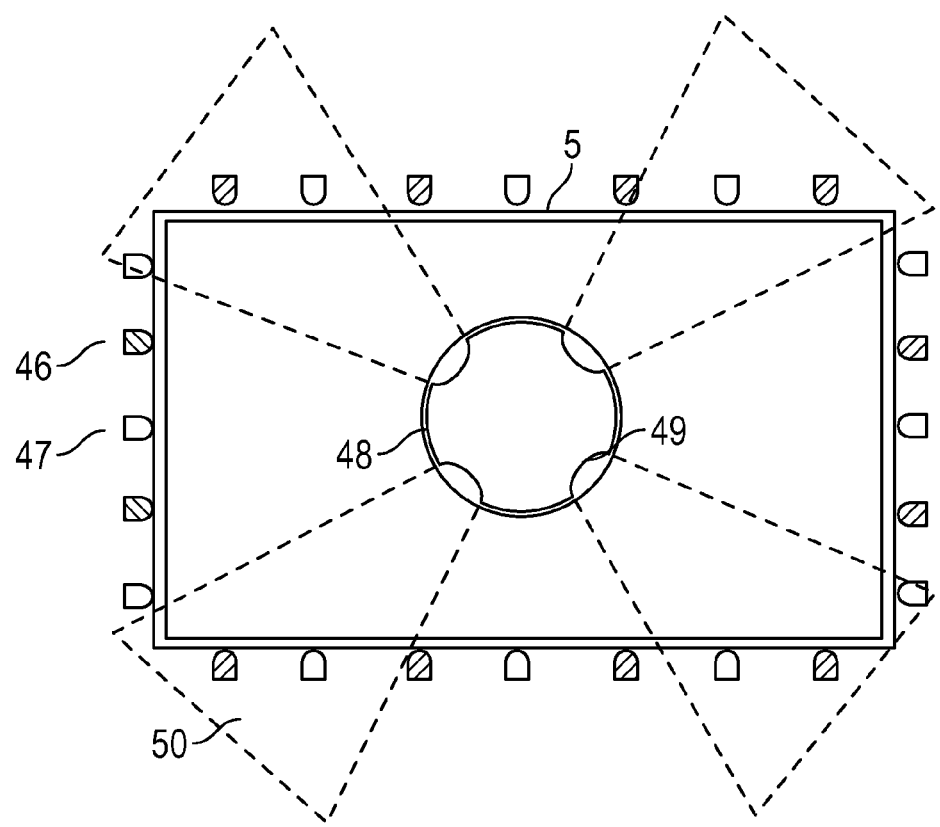
FIG. 9 is a schematic plan view of a passive optical rotary dial according to another exemplary embodiment of the present invention, based on a single plate arrangement.

Optionally the optical tactile input device 30 could also incorporate mechanical actuators, such as, but not limited to, electrical motors. This would provide active tactile feedback such as resistance to motion, vibration, etc. The communication described so far, between computer and optical tactile device, is only single duplex (i.e. from tactile device to computer), however the implementation of full-duplex communication between the computer and the optical tactile input device, in this case the rotary dial 30, would allow control of additional features on the tactile device by the computer. Referring still to FIG. 8 of the drawings, this is achieved by encoding data onto the modulated light emitted into the top plate 5 using, for example, phase modulation. This is then detected by the optical sensor 34 and decoded using the local electronic processing circuitry 29. This allows full-duplex communication between the computer and the optical tactile input device 30 without interfering with the top plate 5 touch detection mechanism and thus allows control of additional features on the tactile device by the computer. Alternatively, the display 4 may be used to communicate with the optical tactile input device 30 by optically communicating with a photodetector 35 which is situated within the optical tactile input device 30. In this embodiment, the photodetector 35 must be relatively stationary with respect to its position above the display 4, or its location always known in order for the display 4 to communicate directly with it. This would establish the communication link between the computer and the optical tactile input device 30 more simply and cost effectively, albeit with a very low data rate. A simple implementation example would be that by flashing a simple dot on the display beneath photodetector 35 a basic binary encoded instruction could be sent to the tactile device 30 to tell it to enable or alternatively disable any additional features which may have been incorporated such as vibration actuators etc. Referring now to FIG. 9 of the drawings, there is provided a further exemplary embodiment of the present invention, comprising a top plate 5 as in previous embodiments, however this time there is no bottom plate 6. Here, the top plate 5 is surrounded by a plurality of optical transmitters 46 and optical receivers 47 distributed around the periphery of the plate. They may be spaced alternately or, possibly they may even be situated one on top of the other such that there is a plane of optical transmitters 46 in the top half of the top plate 5, and a plane of optical receivers 47 in the bottom half of the top plate 5. The optical transmitters 46 spread modulated light evenly throughout the top plate 5 such that, as before, the light is contained by means of TIR. An optical dial 48 embedded within the plate contains a plurality of inwardly protruding curved reflectors 49 which face the peripheral optical transmitters 46 and receivers 47. Any incident light is reflected in a fan-shaped beam 50 as shown. The optical receivers 47 then detect changes in the intensity of the reflected light as a function of time. As such, a relatively simple algorithmic calculation can be used to detect the direction and angular velocity of the dial.

FIG. 9 shows four equally spaced reflectors, used as part of a passive rotary dial, however the invention may have more or less such reflectors as required by the application. The beams may be created using refraction, reflection, and/or optical lenses.

In an alternative embodiment of the present invention, there may be included rotary grating rings, such as those in the embodiment described with reference to FIG. 4 of the drawings. In this embodiment, pulses of light produced by the rotational movement of the dial 48 provide greater accuracy for the determination of the rate of rotation.

Referring now to FIGS. 10A and 10B of the drawings, a switch 60 is provided embedded in a single plate touch-sensitive screen, constructed from a single top plate 5 surrounded by a plurality of optical transmitters 46 and receivers 47. The present exemplary embodiment of the invention works similarly to the passive switch embodiment described with reference to FIGS. 7A and 7B of the drawings, except that when the apertures 42 in the switch housing 41 align with the apertures 18 in the inner grating ring 21, light is reflected back along the path which it has just travelled. The reflectors 61 in this embodiment are planar and aligned perpendicular to the plane of the top plate 5.

The optical receivers 47 detect the increase in light intensity and therefore the computer can determine whether the switch is in the closed or open position. With this embodiment, multiple switches in one plate can be provided. The relative light intensity levels detected at respective optical receivers 47 around the perimeter of the top plate 5 can allow the computer to determine which of the switches has been closed and/or opened. Optionally, using specified modulation frequencies for directed beams of light from specified optical transmitters 46 it would be possible to determine the unique switch which has been actuated.

Figure 10:
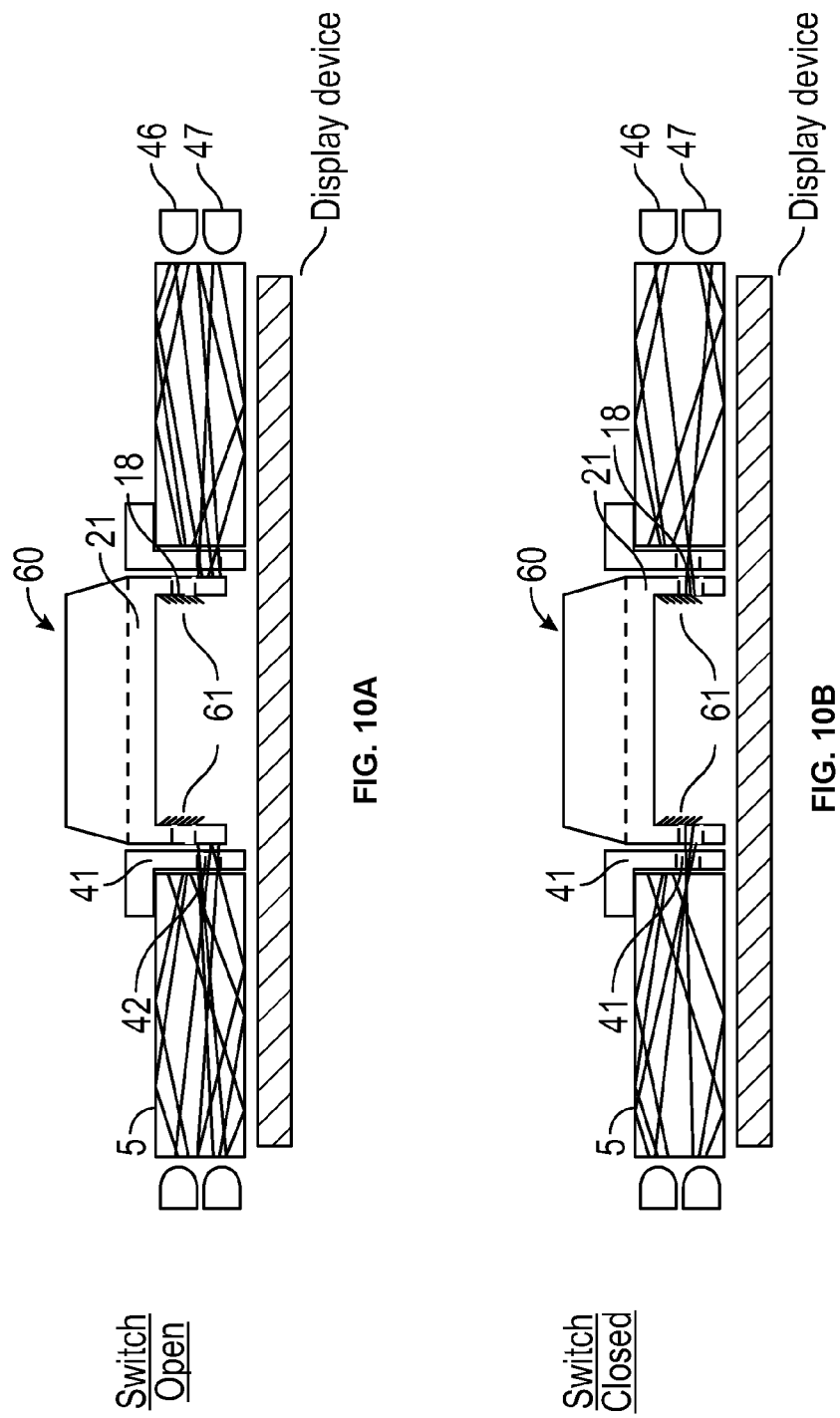
FIGS. 10A and 10B are schematic cross-sectional views of a passive optical push button switch according to another exemplary embodiment of the present invention, based on a single plate arrangement according to a sixth exemplary embodiment of the present invention.

The above embodiments described with respect to FIGS. 9-10b of the drawings are so-called 'passive' embodiments, as the optical tactile input devices do not have their own power source. However, it will be clear to the skilled person that, as with the multi-plate embodiments described above, so-called 'active' versions of the single-plate embodiments are perfectly feasible.

Figure 11:
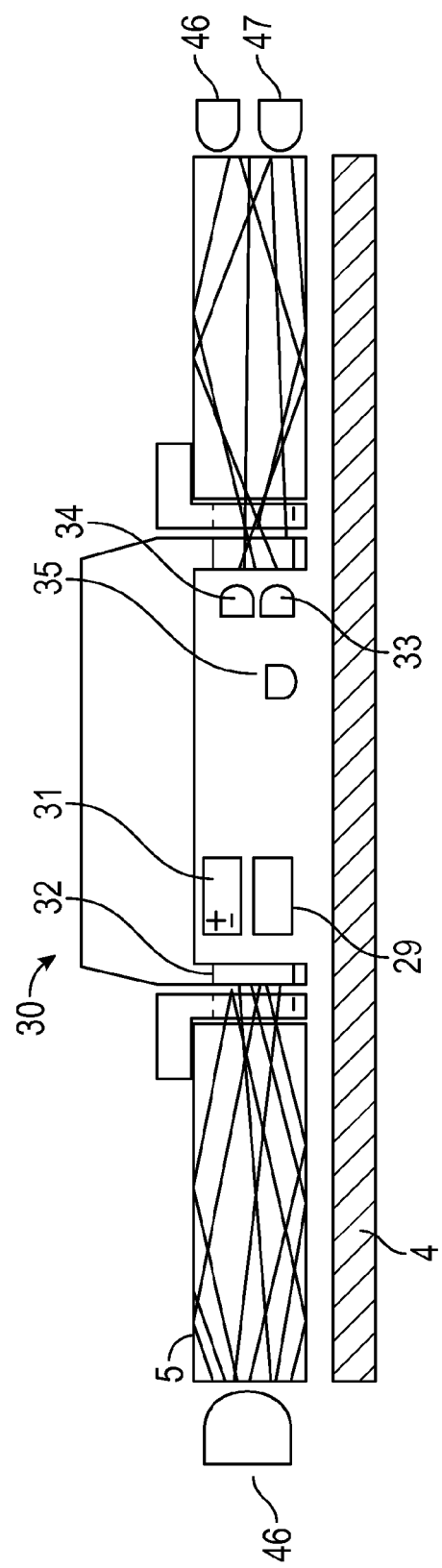
FIG. 11 is a schematic cross-sectional view of an active optical rotary dial according to another exemplary embodiment of the present invention based on a single plate arrangement.

Referring now to FIG. 11 of the drawings, there is provided an optical tactile input device 30 with its own power source, in this embodiment, a battery 31 and a solar cell 32 (or similar optical transducer). The solar cell 32 can be used to trickle charge the battery 31. The present embodiment of the invention has all the same capabilities at the embodiment described with reference to FIG. 8 of the drawings. The difference would be that instead of transmitting the light into the bottom plate 6 to be picked up by the photodetectors 6a, the light would be transmitted, by source 33, back along the plane of the top plate 5 toward the optical receivers 47.

Again, to avoid interference between touch signals and optical tactile input device signals, light sent from the optical tactile input device could be modulated at a different frequency to the other optical transmitters 46 around the periphery of the top plate 5. Additionally, as before, full-duplex communication between the computer and the optical tactile input device 30 can be established by means of encoding the modulated light transmitted into the top plate 5 by the optical transmitters 46 with the required data. This signal could then be detected by the tactile device sensor 34, and decoded using the local electronic processing circuitry 29. Alternatively, as previously discussed, a simpler and lower bandwidth form of computer to tactile device communication could be implemented using the display and the photodetector 35, which is directed towards a specific section of the display. By flashing dots on the display directly beneath the photodetector 35 a simple communication channel is formed. Other possible mechanisms for full duplex communications between the computer and the optical tactile device could be by establishing RF links, or using near-field communications, etc. But these are again more complex and power hungry than those previously described.

Figure 12:
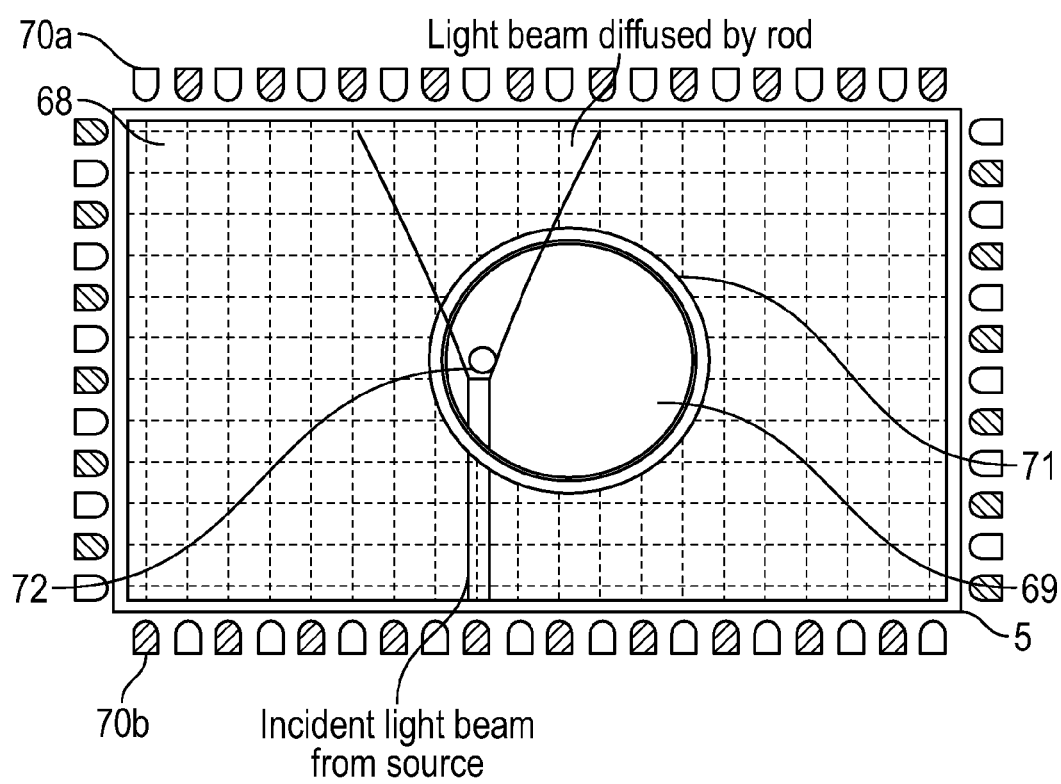
FIG. 12 is a schematic plan view diagram of a passive optical rotary dial according to another exemplary embodiment of the present invention based on a single plate with grid of beams arrangement.
Figure 13:
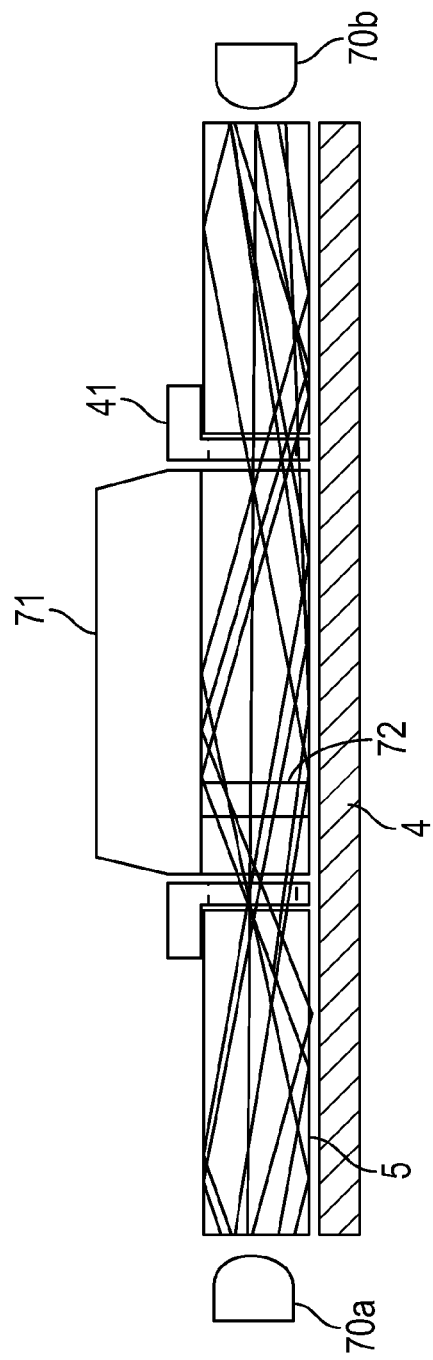
FIG. 13 is a cross-sectional diagram of a passive optical rotary dial according to another exemplary embodiment of the present invention based on a single plate with grid of beams arrangement.

Finally, referring to FIGS. 12 and 13 of the drawings, there is illustrated a fourth exemplary embodiment of the present invention, comprising an optically clear top plate 5, positioned over a display 4. Around the perimeter of the top plate 5 are alternating optical transmitters 70a and receiver 70b pairs, aligned such that each transmitter 70a is directly opposite a receiver 70b, and vice versa. Each transmitter 70a directs a beam of collimated light directly toward its respective receiver, wherein the light is modulated uniquely for each transmitter/receiver pair. The beams are maintained within the top plate by TIR. The transmitters 70a may all be on either simultaneously, or sequentially.

In the example shown in FIGS. 12 and 13, the optical tactile input device is an optically clear dial 71, however any of the above described embodiments may alternatively be used. The dial should be the same material at the top plate 5, and, if it is not the same material, then must at least have the same refractive index in order to reduce deviation in the direction of travel of the collimated beam as it travels across the gap between the dial 71 and the top plate 5. In order to minimise the shift of the beam within the dial 71, the gap must be kept as small as possible.

Within the dial, offset from the centre, there is a rod 72 of lightly doped material capable of diffusing, diffracting, absorbing and reflecting light from the collimated beams. This can be seen best by looking at FIG. 13. As the dial 71 is turned, the rod 72 tracks a circular path in the top plate 5. As the rod 72 cuts across beams, the light is dispersed, and the intensity is attenuated. Therefore, scanning across and along the top plate 5 whilst simultaneously reading the level of received signals at the receivers 70b the position of the rod 72, and therefore the rotational position of the dial 71 can be determined. Also this can allow calculating of the rotations rate.

It will be apparent to a person skilled in the art, from the foregoing description, that modifications and variations can be made to the described embodiments without departing from the scope of the invention as defined by the appended claims.

The invention claimed is:

1. An optical input device comprising:
   at least one optically clear plate;
   at least one light source positioned at a peripheral edge of said optically clear plate, said light source being arranged and configured to transmit frequency modulated light into said optically clear plate along planar length of the optically clear plate, at an angle such that said modulated light is contained within said optically clear plate by way of total internal reflection thereof;

at least one sensor configured to receive some or all of said modulated light;

at least one input mechanism embedded within said optically clear plate and arranged such that some or all of said modulated light falls on or passes through a side wall of said input mechanism before being transmitted to said at least one sensor, wherein said input mechanism is configured to be mechanically moveable relative to said optically clear plate;

a display screen communicably coupled to said at least one sensor; and a processing module for receiving signals from said at least one sensor and for generating data representative of information to be displayed on said display screen; wherein the optical input device is configured such that both mechanical movement of said input mechanism relative to said optically clear plate and application of pressure to said optically clear plate generate respective changes in said modulated light received by said at least one sensor; and wherein a change in the modulated light received by said at least one sensor causes said processing module to generate data representative of a change in information to be displayed on said display screen.

2. An optical input device according to claim 1, further comprising an optically dispersive base plate, wherein said at least one sensor is positioned at a peripheral edge of the optically dispersive base plate, said display screen being situated beneath said optically dispersive base plate.

3. An optical input device according to claim 2, wherein the at least one light source comprises at least one light source configured to emit light at a primary optical frequency and at least one light source configured to emit light at a secondary optical frequency, and wherein the optical input device further comprises at least one optical frequency selective filter arranged and configured to prevent light at the primary optical frequency from entering the input mechanism and to transmit light at the secondary optical frequency into the input mechanism.

4. An optical input device according to claim 2, comprising exactly two optically clear plates, each said optically clear plate having at least one light source positioned at a peripheral edge thereof, said at least one light source being arranged and configured to transmit frequency modulated light into each said optically clear plate along its respective planar length at an angle such that said modulated light is contained within each said optically clear plate by way of total internal reflection thereof, wherein the frequency modulated light contained within one of said optically clear plates is modulated at a different frequency to the frequency modulated light within the other of said optically clear plates.

5. An optical input device according to claim 2, wherein said input device comprises a substantially cylindrical, optically clear, rotary, dial.

6. An optical input device according to claim 5, wherein said rotary dial further comprises an angled reflector that is located within said dial and that is positioned off-center of said dial and angled downwardly toward said base plate, said angled reflector transmitting incident light from said at least one light source down onto said optically dispersive base plate, wherein the intensity of the incident light is dispersed as it travels toward said at least one sensor.

7. An optical input device according to claim 6, wherein said rotary dial further comprises at least two concentric grating rings including an inner grating ring and an outer grating ring positioned within the optically clear dial, wherein the inner gating ring and the outer grating ring share a common central axis with said rotary dial and are rotatable in opposing directions about said central axis, relative to one another.

8. An optical input device according to claim 7, wherein said outer grating ring comprises a plurality of optically clear apertures.

9. An optical input device according to claim 7, wherein said inner grating ring comprises a single optically clear aperture, wherein said single optically clear aperture on said inner grating ring is fixed in alignment with said reflector.

10. An optical input device according to claim 2, wherein said input mechanism is a generally cylindrical push switch having an opaque circumferential side and a circular top side, said push switch being configured such that said switch is moveable between an open configuration and a closed configuration.

11. An optical input device according to claim 10, wherein said push switch further comprises a generally circular angled reflector which runs around an inner perimeter of said push switch, said reflector being angled downwardly toward said base plate.

12. An optical input device according to claim 11, wherein said push switch further comprises at least one optically clear aperture in said circumferential side thereof.

13. An optical input device according to claim 12, wherein, when said push switch is in said open configuration, said optically clear aperture is misaligned with said reflector, such that no light is transmitted into said base plate and, wherein, when said push switch is in said closed configuration, said optically clear aperture is aligned with said reflector, such that light is transmitted into said base plate.

14. An optical input device according to claim 10, wherein application of pressure to the circular top side of said push switch moves said push switch from said open configuration to said closed configuration.

15. An optical input device according to claim 1, wherein said input mechanism is comprised of a generally cylindrical optically clear rotary dial, said rotary dial comprising at least one curved reflector fixed to a circumferential side of said rotary dial.

16. An optical input device according to claim 15, wherein said optically clear plate is surrounded by a plurality of optical transmitter and receiver pairs.

17. An optical input device according to claim 1, wherein said input mechanism is an optically clear generally cylindrical rotary dial having an off-center, optically dispersive rod run therethrough.

18. An optical input device according to claim 17, wherein said optically clear plate is surrounded by alternating optical transmitter and receiver pairs, each said optical transmitter being geometrically opposite one of each said optical receiver.

19. An optical input device according to claim 1, wherein said input mechanism further comprises a local power source, an encoder, and a local light source, and wherein said power source comprises a battery cell and a solar cell.

20. A method of operating an optical input device comprising at least one optically clear plate, at least one light source positioned at a peripheral edge of said optically clear plate, at least one input mechanism embedded within said optically clear plate, and at least one sensor, the method comprising:

transmitting frequency modulated light from said at least one light source into said optically clear plate along a planar length of the optically clear plate at an angle such that said modulated light is contained within said optically clear plate by way of total internal reflection thereof;

receiving some or all of said modulated light at said at least one sensor;

moving said input mechanism relative to said optically clear plate and/or applying pressure to said input mechanism to generate a change in said modulated light received by said at least one sensor;

detecting the change in said modulated light received by said at least one sensor and generating data representative of a change in information to be displayed on a display screen; and displaying information on the display screen based on the generated data.

* * * * *